(12) United States Patent
Dennison

(10) Patent No.: US 10,545,844 B2
(45) Date of Patent: Jan. 28, 2020

(54) PRINT VERIFICATION SYSTEM THAT REPORTS DEFECTIVE PRINTHEADS

(71) Applicant: Carl Michael Dennison, Firestone, CO (US)

(72) Inventor: Carl Michael Dennison, Firestone, CO (US)

(73) Assignee: Ricoh Company, Ltd., Tokyo (JP)

( * ) Notice: Subject to any disclaimer, the term of this patent is extended or adjusted under 35 U.S.C. 154(b) by 137 days.

(21) Appl. No.: 15/720,113

(22) Filed: Sep. 29, 2017

(65) Prior Publication Data

US 2019/0102270 A1 Apr. 4, 2019

(51) Int. Cl.
*G06F 11/22* (2006.01)
*G06F 3/12* (2006.01)
*G06F 11/07* (2006.01)

(52) U.S. Cl.
CPC ........ *G06F 11/2221* (2013.01); *G06F 3/1203* (2013.01); *G06F 3/1229* (2013.01); *G06F 11/0733* (2013.01)

(58) Field of Classification Search
CPC ....... G06F 11/22; G06F 11/07; G06F 11/2221
USPC ......................................................... 714/25
See application file for complete search history.

(56) References Cited

U.S. PATENT DOCUMENTS

| | | | |
|---|---|---|---|
| 8,233,693 B1 * | 7/2012 | DiFrancesco | G06T 7/001 382/141 |
| 8,562,099 B2 | 10/2013 | Kido | |
| 8,672,436 B2 | 3/2014 | Powers et al. | |
| 8,807,684 B2 | 8/2014 | Allworth et al. | |
| 8,820,880 B2 | 9/2014 | Chandu et al. | |
| 9,033,452 B2 | 5/2015 | Takada | |
| 9,387,711 B2 | 7/2016 | Kyoso | |
| 9,427,963 B2 | 8/2016 | Clippingdale et al. | |
| 9,507,547 B1 * | 11/2016 | Dennison | G06F 3/121 |
| 2003/0198398 A1 * | 10/2003 | Guan | G06K 9/3283 382/255 |
| 2004/0150686 A1 * | 8/2004 | Lee | B41J 11/46 347/16 |
| 2005/0237351 A1 * | 10/2005 | Heiles | B41J 29/393 347/9 |
| 2006/0082609 A1 | 4/2006 | Walmsley et al. | |
| 2006/0087664 A1 * | 4/2006 | Pozuelo | B41J 13/0009 358/1.5 |
| 2008/0211854 A1 | 9/2008 | Takahashi et al. | |

(Continued)

FOREIGN PATENT DOCUMENTS

JP 4258685 B2 4/2009

*Primary Examiner* — Kamini B Patel
(74) *Attorney, Agent, or Firm* — Duft & Bornsen, PC

(57) ABSTRACT

Systems and methods are provided for print verification that reports defective printheads. One embodiment is a Print Verification System (PVS) that includes an interface to receive print data, and an imaging device to obtain image data of printed output of the print data. The PVS also includes a processor to detect a print error on a page by comparing the print data and the image data. The processor determines a lateral distance of a location of the print error with respect to an edge of the page, identifies a print engine that printed the page, determines a lateral offset of the print engine with respect to the edge of the page, identifies a printhead among a plurality of printheads of the print engine that caused the print error based on the lateral distance of the print error and the lateral offset of the print engine.

20 Claims, 11 Drawing Sheets

(56) References Cited

U.S. PATENT DOCUMENTS

| | | | |
|---|---|---|---|
| 2011/0242187 A1* | 10/2011 | Mongeon | B41J 3/543 347/19 |
| 2012/0105529 A1* | 5/2012 | Powers | B41J 2/2139 347/14 |
| 2012/0163852 A1* | 6/2012 | Kimura | G03G 15/5062 399/82 |
| 2012/0229537 A1 | 9/2012 | Ernst et al. | |
| 2013/0076820 A1 | 3/2013 | Chandu et al. | |
| 2013/0293923 A1* | 11/2013 | Fisher | G06F 3/121 358/1.15 |
| 2014/0056484 A1* | 2/2014 | Lotz | H04N 1/00 382/112 |

* cited by examiner

Print Start Date: 2017-04-01
Print End Date: 2017-04-13

| Engine | Print Head | Defects |
|--------|-----------|---------|
| 1 | 2 | 1 |
| 1 | 3 | 18 |
| 1 | 4 | 1 |
| 1 | 5 | 1 |
| 1 | 8 | 18 |
| 1 | 9 | 1 |
| 1 | 10 | 1 |
| 1 | 11 | 2 |
| 1 | 14 | 3 |
| 1 | 15 | 2 |
| 1 | 16 | 2 |
| 1 | 17 | 1 |
| 2 | 5 | 4 |
| 2 | 6 | 1 |
| 2 | 7 | 1 |
| 2 | 8 | 4 |
| 2 | 11 | 2 |
| 2 | 12 | 1 |

PRINT VERIFICATION SYSTEM THAT REPORTS DEFECTIVE PRINTHEADS

FIELD OF THE INVENTION

The invention relates to the field of printing, and in particular, to verifying the printed output of a printer.

BACKGROUND

Entities with substantial printing demands typically use a production printer. A production printer is a high-speed printer used for volume printing, such as a continuous-forms printer that prints on a web of print media stored on a large roll. A production printer typically includes a localized print controller that manages the overall operation of the printer, and a marking engine (sometimes referred to as an "imaging engine" or a "print engine"). The marking engine includes one or more arrays of printheads.

Upon receiving a print job, the print controller rasterizes logical pages of the job (e.g., to create bitmaps representing each page of the job), and the marking engine operates individual printheads to mark the web based on the rasterized logical pages. Thus, the printer marks physical pages based on the digital information of the print job.

A Print Verification System (PVS) verifies that the printed pages from a printer are error-free. Thus, a PVS may scan the marked/printed pages of a job from a production printer, and may compare each printed page to a corresponding rasterized version kept in memory. If there is a discrepancy, such as an errant droplet of ink, the PVS may identify the error and report it for handling by an operator of the printer. Users continue to desire enhancements that are capable of increasing the functionality and effectiveness of a PVS.

SUMMARY

Embodiments described herein use a Print Verification System (PVS) to identify individual printheads that cause print errors. The PVS may take into account margins that are to be cut off the sheet, the justification of the print engine with respect to the sheet, and/or the N-up configuration of a print job to accurately determine which printhead of a printer is causing which print errors. By tracking this information automatically over time, the PVS is able to provide detailed reports describing error rates of specific types of errors for each of the printheads of the print system. Users may therefore easily track error trends for the printer and target individual printheads for specific repair operations to remedy print errors.

One embodiment is a system that includes a Print Verification System. The PVS includes [to be completed with finalized claims]

Other illustrative embodiments (e.g., methods and computer-readable media relating to the foregoing embodiments) may be described below.

DESCRIPTION OF THE DRAWINGS

Some embodiments of the present invention are now described, by way of example only, and with reference to the accompanying drawings. The same reference number represents the same element or the same type of element on all drawings.

FIG. 10 illustrates a printhead error log in an illustrative embodiment.

DETAILED DESCRIPTION

The figures and the following description illustrate specific illustrative embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

Figure 1:
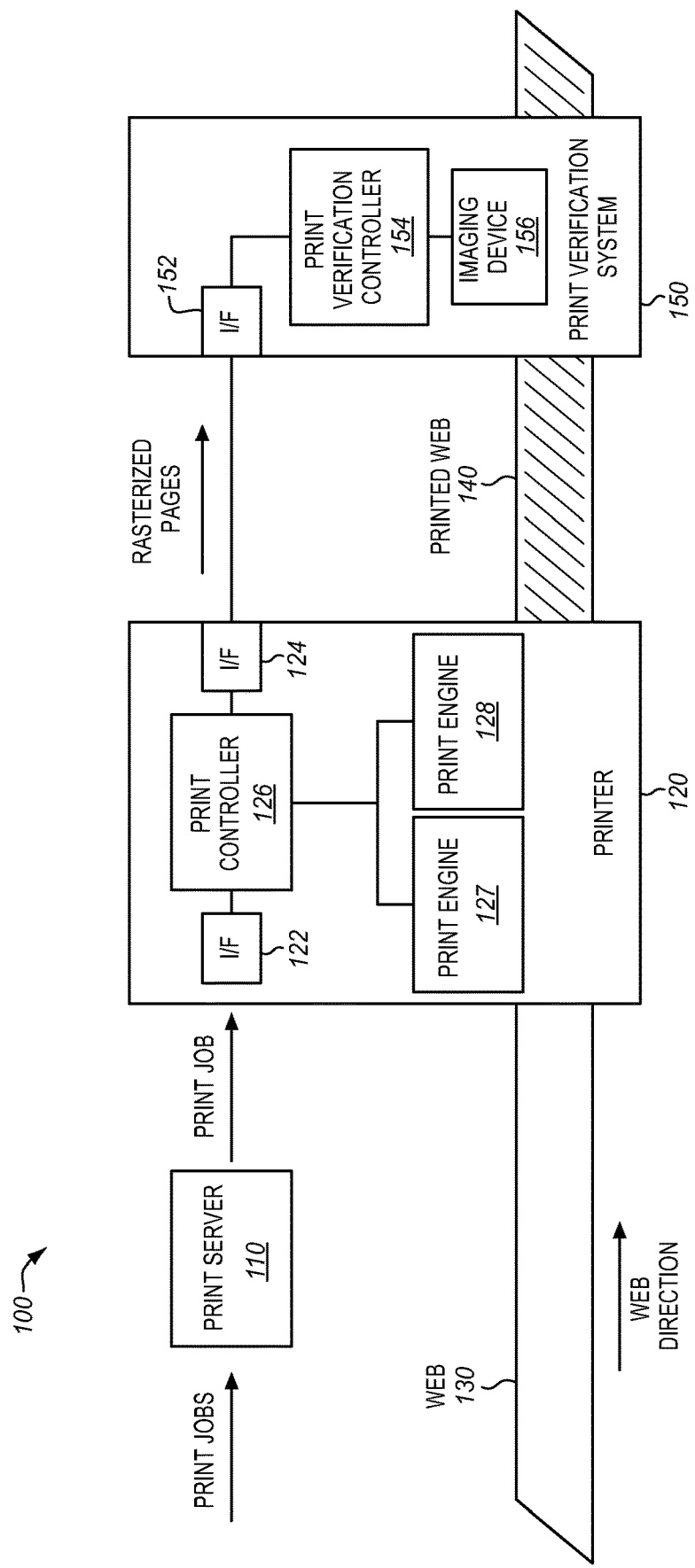
FIG. 1 is a diagram of a printing system in an illustrative embodiment.

FIG. 1 is a diagram of a print system 100 in an illustrative embodiment. The print system 100 includes a print server 110, one or more printer(s) 120, and a print verification system (PVS) 150. In general, the print server 110 receives print jobs from users and schedules the print jobs with a printer 120 under its domain. The printer 120 marks a web 130 of print media (e.g., paper) based on the incoming print data of the print job, resulting in a printed web 140. The PVS 150 verifies that print jobs have been printed correctly by comparing the printed web 140 with rasterized pages of the print job. In addition to detecting print errors, the PVS 150 is enhanced to detect which printheads of the printer 120 caused the print errors, as described in greater detail below.

The printer 120 may receive an incoming print job from the print server 110 via the interface 122, generate rasterized data for the print job with the print controller 126, and transmit the rasterized data for the print job to one or more print engines 127-128. The print engines 127-128 may comprise any combination of printing machinery operable to mark the web 130 with the rasterized data. The print controller 126 may also transmit a rasterized version of the print job to the PVS 150. For instance, as each logical page of a print job is rasterized, the print controller 126 may transmit those rasterized pages via the interface 124 to the PVS 150.

The PVS 150 includes an interface 152, a print verification controller 154, and one or more imaging device(s) 156. The interface 152 (and/or the interfaces 122/124 of the printer 120) may include any combination of hardware devices or components (e.g., an Ethernet interface, wireless interface, etc.) operable to receive/transmit print data for print jobs. The imaging device 156 may comprise a camera, scanner, densitometer, spectrophotometer or other suitable component for acquiring images of printed content. The print verification controller 154 compares images of the physical pages from the printed web 140 captured by the imaging device 156 with rasterized pages received from the printer 120. The comparison enables the print verification controller 154 to determine whether there are any discrepancies that indicate a printing error on a printed page. Additionally, the print verification controller 154 is enhanced to accurately identify individual printheads of the print engines 127-128 which caused the printing error, as further described below.

Figure 2:
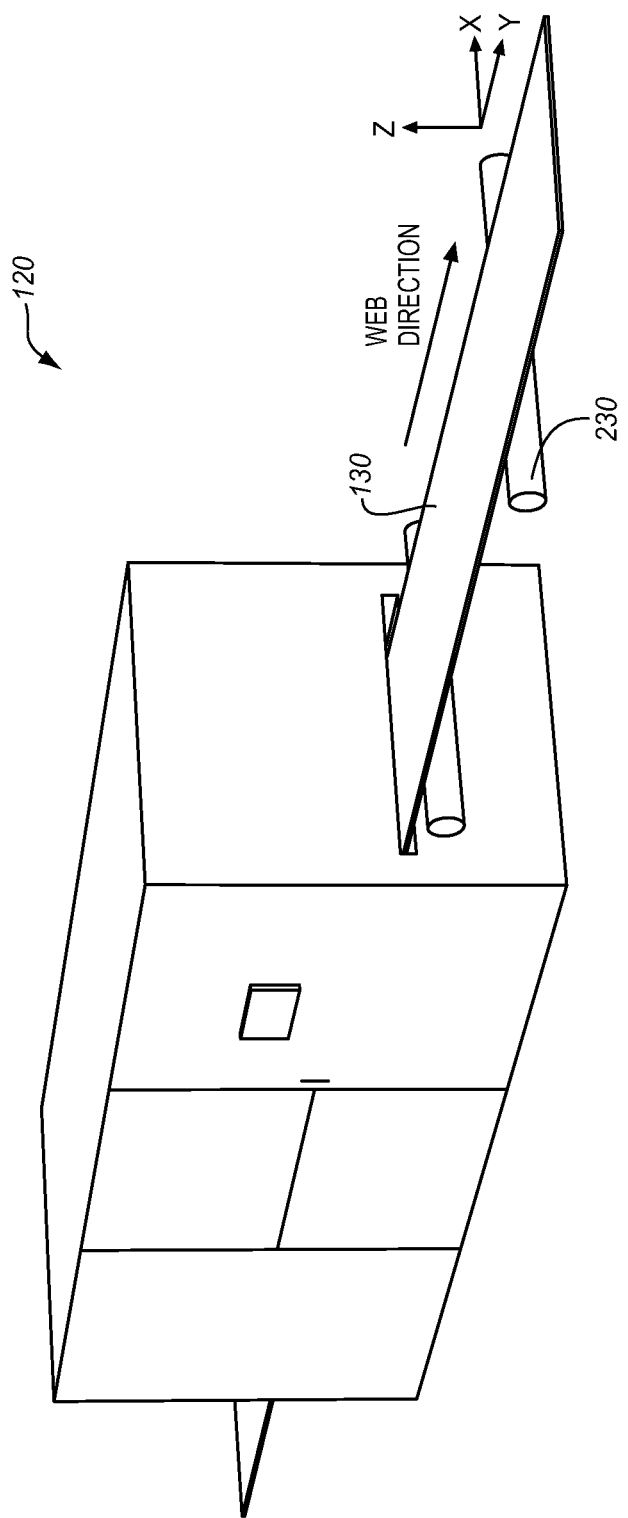
FIG. 2 is a perspective view of a printer in an illustrative embodiment

FIG. 2 is a perspective view of the printer 120 in an illustrative embodiment. As shown in this embodiment, the printer 120 may comprise a continuous-forms printer that applies marks to the web 130 of continuous-forms print media. The applied marking material may comprise ink in the form of any suitable fluid (e.g., aqueous inks, oil-based paints, additive manufacturing materials, etc.) for marking the web 130. One or more rollers 230 position web 120 as it travels through the print system 100. FIG. 2 illustrates a direction in which the web 130 travels during printing (Y) (i.e., a direction that proceeds along a length of the web 130), a lateral direction (X) perpendicular to a Y direction (i.e., a direction that proceeds along a width of the web 130), and a direction Z. The Y direction and the X direction may also be known as the "process direction" and "cross-process direction," respectively.

Figure 3:
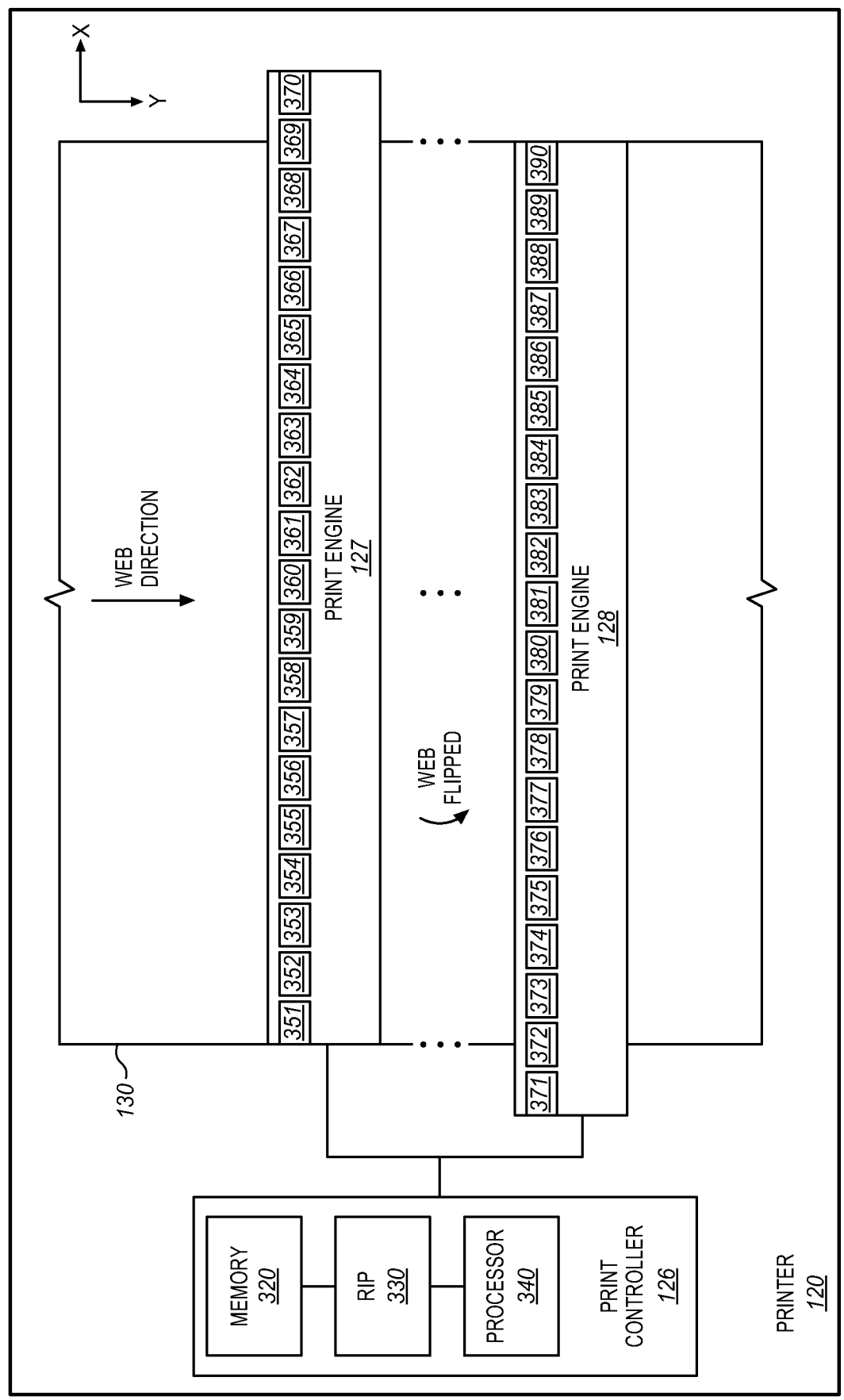
FIG. 3 is a top view diagram of a printer in an illustrative embodiment

FIG. 3 is a top view diagram of the printer 120 in an illustrative embodiment. The print controller 126 may include memory 320 to store incoming print data (e.g., Page Description Language (PDL) print data), a Rasterization Image Processor (RIP) to rasterize the print data into bitmap data (e.g., and stored in memory 320 or a separate print spool), and a processor 340 to manage operations of the print controller 126 including directing the print engines 127-128 to mark the web 130 according to marking instructions.

FIG. 3 also illustrates relative positions of the print engines 127-128 and the web 130. In this example, the print engine 127 includes an array of printheads 351-370 arranged in the X direction across the web 130, and the print engine 128 includes an array of printheads 371-390 arranged in the X direction at a location downstream from the print engine 127 in the Y direction. Each printhead 351-390 may include multiple rows of nozzles separated along the Y direction that each discharge/eject drops of ink onto the web 130. The printheads 351-390 may be fixed during the operation of the printer 120 and thus each of the printheads 351-390 may consistently mark a specific, predefined location along the X direction. During printing, bitmap data defines which printhead/nozzle ejects ink, thereby converting digital information into printed images on the web 130.

Furthermore, the print engines 127-128 of the printer 120 may be aligned for duplex printing capability. That is, the print engine 127 may be left edge justified with the web 130 and the print engine 128 may be right edge justified with the web 130, as shown in FIG. 3. Accordingly, the print engine 127 may print on a front side of the web 130, then after the web 130 is flipped (e.g., via a flipping/turning device (not shown)), the print engine 128 may print on a back side of the web 130. With this configuration, the print engines 127-128 may print on both sides of the web 130 and align with a common edge of the web 130 despite being oppositely justified with the web 130. It will be appreciated that the print engines 127-128 may belong to different printers/housings in some embodiments.

Figure 4:
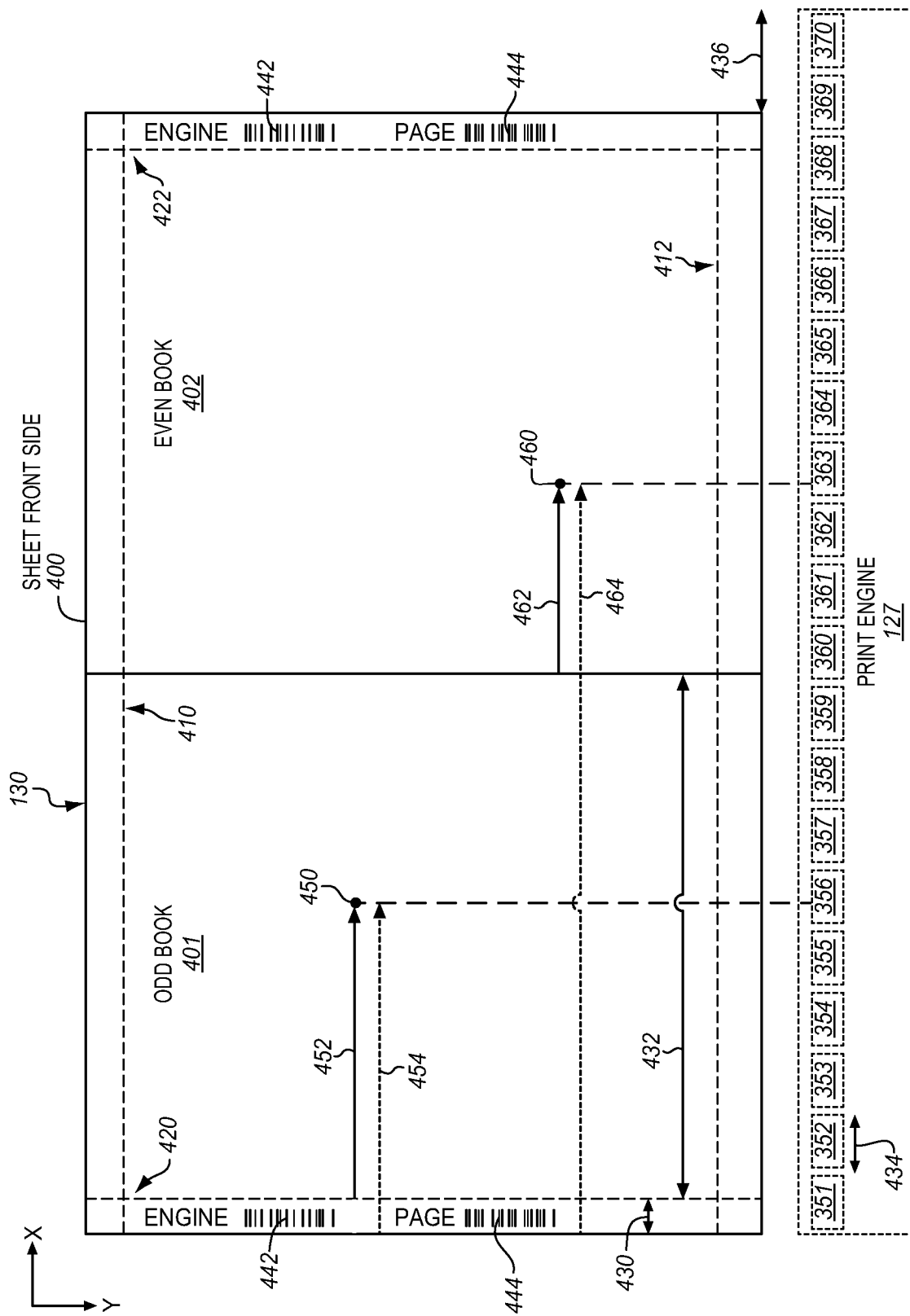
FIG. 4 illustrates a top view of an example printed output on a sheet front side according to the example printer configuration of FIG. 3.

FIG. 4 illustrates a top view of an example printed output on a sheet front side 400 of the web 130 according to the example printer configuration of FIG. 3. As previously described with respect to FIG. 3, the sheet front side 400 may be printed with the print engine 127. Accordingly, FIG. 4 illustrates a relative position of the print engine 127 with respect to the sheet front side 400 in which the printhead 351 is left edge justified with the web 130 and the printhead 370 and half of the printhead 369 extend beyond the right edge of the sheet front side 400 for an overhang distance 436.

Assume, for this example, that the print engines 127-128 print pages in a 2-up format onto sheet sides with one page placed in an odd book 401 (e.g., left half of the sheet front side 400 in the X direction) and another page placed in an even book 402 (e.g., right half of the sheet front side 400 in the X direction). The sheet front side 400 may thus include printed pages in an area of the books 401-402, and may also include margins (e.g., a top margin 410, a bottom margin 412, a left margin 420, and a right margin 422) to be cut away from the page prior to delivery of the page to the customer, as indicated by the dashed lines on the sheet front side 400.

One or more of the margins may include marks 442-444 for analysis by the PVS 150. For instance, a first mark 442 may indicate the print engine used to mark the sheet front side 400, and a second mark 444 may indicate a page number that is used within the print job to distinguish the current page of the document from other pages. Alternatively or additionally, the marks 442-444 may indicate a book/document number that is used within the print job to distinguish the document within a multi-document print job. The print controller 126 of the printer 120 may insert the marks 442-444 onto the logical pages of a print job as text, a barcode, a symbol, etc. The PVS 150 may identify these marks based on their relative positions within the image of the sheet front side 400, and may read the marks via the imaging device 156 to retrieve the above-described information.

Further assume, for this example, that the sheet front side 400 is printed with two print errors—a first print error 450 on a page printed on the odd book 401, and a second print error 460 printed on a page printed on the even book 402. A print error may include mark defects such as ink locations, sizes, shapes, or voids which were not included in the print data of a print job. Thus, when the PVS 150 reviews the physical pages of the print job, it may detect the print errors 450/460 based on discrepancies between the logical pages and the physical pages of the web 130 of print media. Moreover, the PVS 150 may detect a location (e.g., X and Y coordinate) of the print errors 450/460 relative to an upper left corner of each of the books 401-402. As such, the PVS 150 may report the first print error 450 as having a first lateral distance 452 relative to a left edge of the odd book 401, and report the second print error 460 as having a second lateral distance 462 relative to a left edge of the even book 402.

However, to determine which of the printheads 351-370 of the print engine 127 caused the first print error 450 in the odd book 401, the PVS 150 may, in addition to the detected first lateral distance 452, take into account the margin 430 between a left edge of the web 130 and an edge of the page in the odd book 401, resulting in a converted lateral distance 454 for the first print error 450. The PVS 150 may correlate the converted lateral distance 454 with the printheads 351-370 of the print engine 127 based on a printhead width 434 of each of the printheads 351-370. In this example, the converted lateral distance 454 corresponds with the printhead 356, as indicated by the dashed line. Additionally, to correlate the second print error 460 to one of the printheads 351-370, the PVS 150 may, in addition to the second lateral distance 462 and the margin 430, take into account a width 432 of the odd book 401, resulting in a converted lateral distance 464 for the second print error 460. With the printhead width 434, the PVS 150 may determine that the converted lateral distance 464 corresponds with the printhead 363, as indicated by the dashed line.

Figure 5:
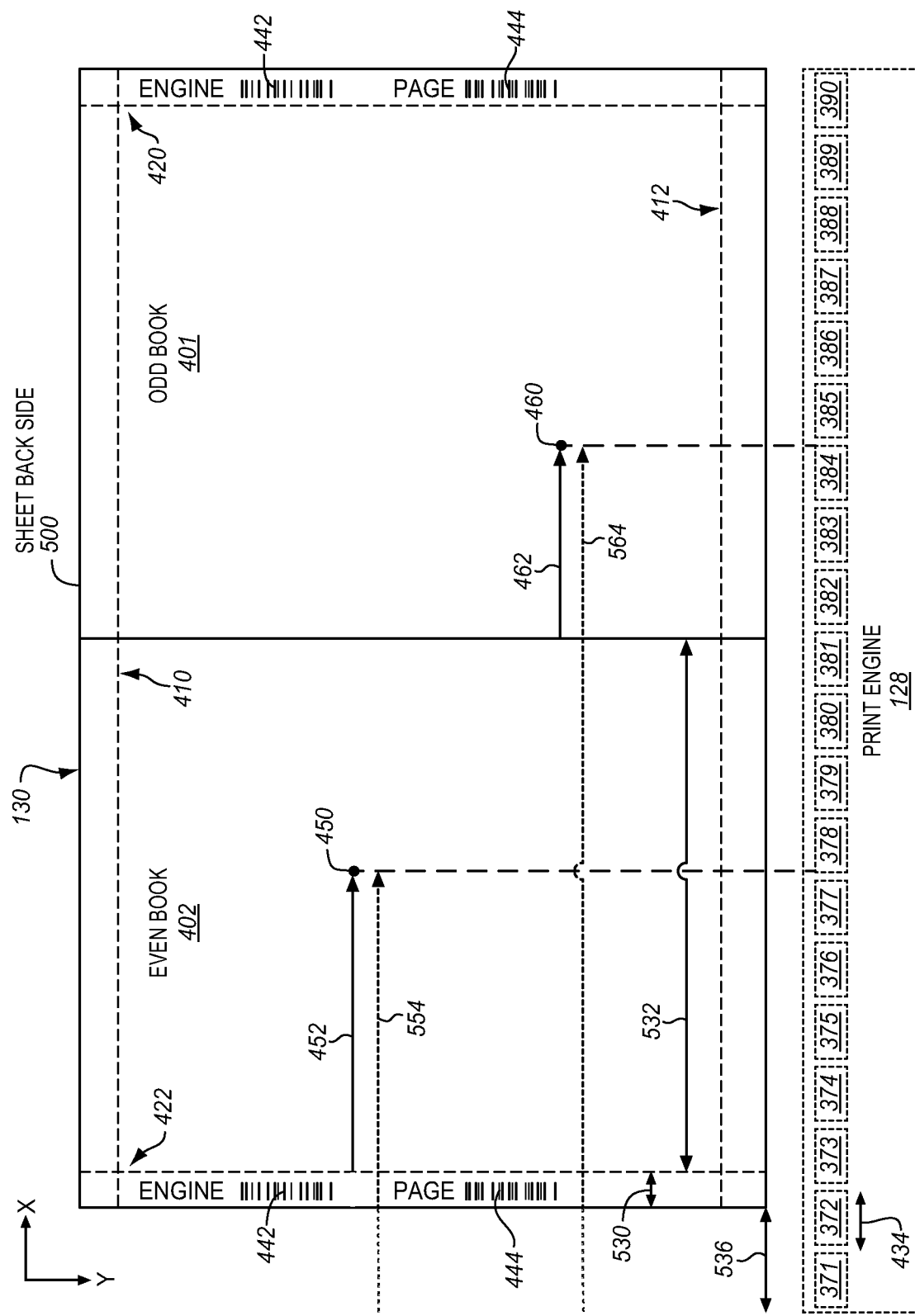
FIG. 5 illustrates a top view of an example printed output on a sheet back side according to the example printer configuration of FIG. 3.

FIG. 5 illustrates a top view of an example printed output on a sheet back side 500 of the web 130 according to the example printer configuration of FIG. 3. As previously described with respect to FIG. 3, the sheet back side 500 may be printed with the print engine 128. Accordingly, FIG. 5 illustrates a relative position of the print engine 128 with respect to the sheet back side 500 in which the printhead 390 is right edge justified with the web 130 and the printhead 371 and half of the printhead 372 extend beyond the left edge of the sheet back side 500 for an overhang distance 536.

FIG. 5 illustrates elements already described above with respect to FIG. 4, and descriptions of such may thus be omitted for brevity. Note, however, that the web 130 is flipped to print the sheet back side 500 with the print engine 128, and thus the left/right margins and the odd book 401 and the even book 402 are horizontally flipped for the sheet back side 500 relative to the sheet front side 400. To illustrate differences in horizontal alignment of the print engine 128 relative to the print engine 127, the print errors 450/460 are shown in the same relative locations as that already described above for the sheet front side 400.

As shown by this example, to determine which of the printheads 371-390 of the print engine 128 caused the first print error 450 in the even book 402, the PVS 150 may, in addition to the detected first lateral distance 452, take into account the margin 530 between a left edge of the web 130 and an edge of the page in the even book 402, resulting in a converted lateral distance 554 for the first print error 450. The PVS 150 may correlate the converted lateral distance 554 with the printheads 371-390 of the print engine 128 based on a printhead width 534 of each of the printheads 371-390. In this example, the converted lateral distance 554 corresponds with the printhead 378, as indicated by the dashed line.

Additionally, to correlate the second print error 460 to one of the printheads 371-390, the PVS 150 may, in addition to the second lateral distance 462 and the margin 530, take into account a width 532 of the even book 402, resulting in a converted lateral distance 564 for the second print error 460. With the printhead width 534, the PVS 150 may determine that the converted lateral distance 564 corresponds with the printhead 385, as indicated by the dashed line. Accordingly, the PVS 150 may accurately identify an individual printhead that caused a print error even in highly complex printing arrangements with multiple print engines printing in duplex and N-up configurations.

Figure 6:
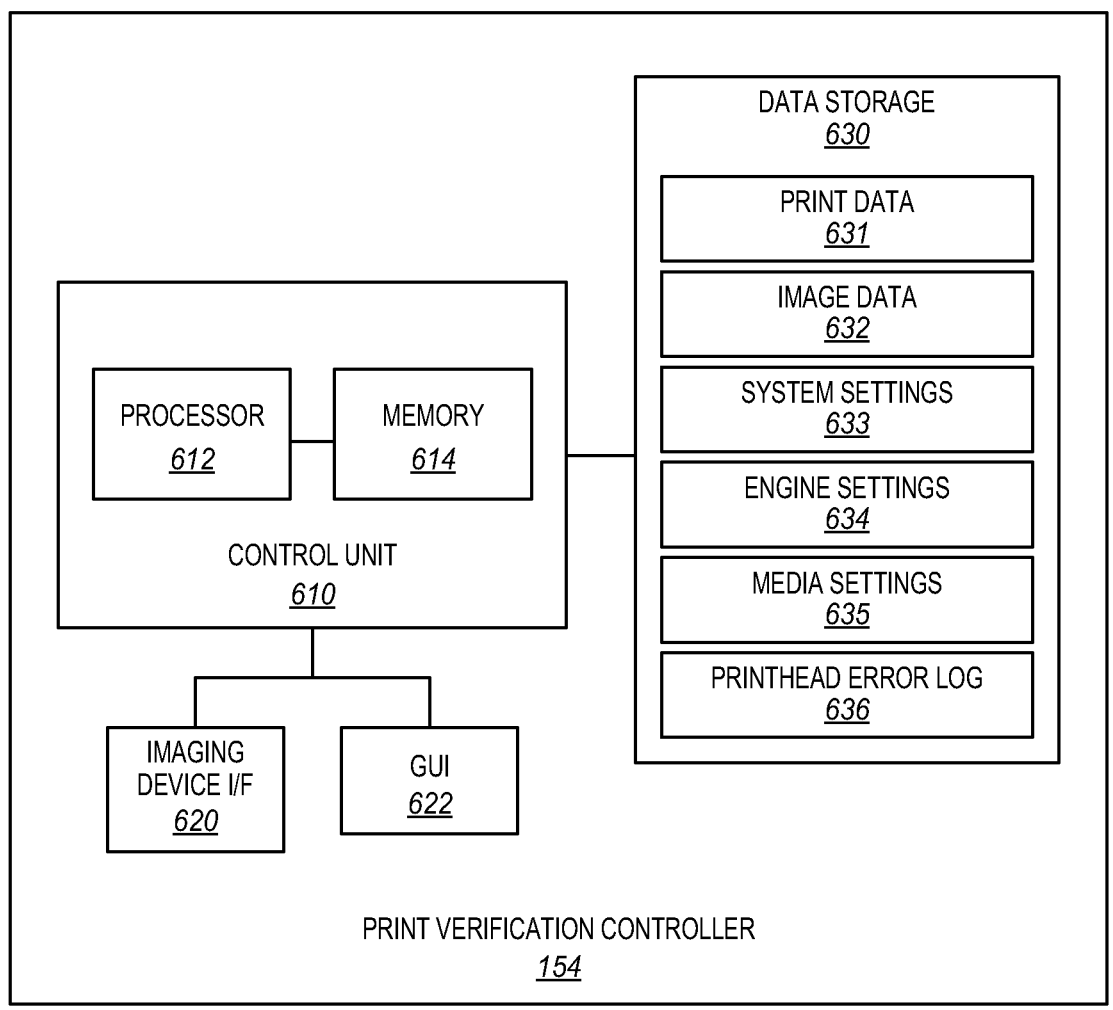
FIG. 6 illustrates a block diagram of print verification controller 154 in an illustrative embodiment.

FIG. 6 illustrates a block diagram of the print verification controller 154 in an illustrative embodiment. The print verification controller 154 includes a control unit 610, imaging device interface 620, a graphical user interface (GUI) 622, and data storage 630. The data storage 630 may be implemented by any combination of memory devices or components and may store print data 631, image data 632, system settings 633, engine settings 634, media settings 635, and a printhead error log 636. The control unit 610 is configured to determine which rasterized pages (e.g., stored as print data 631) correspond with the physically printed pages received by imaging device interface 220 (e.g., and stored as image data 632). The control unit 610 is also configured to detect the presence of a stray mark on a printed page by comparing it to the corresponding rasterized page in the print job. This quality control process ensures that print jobs created by the printer 120 are thoroughly checked before delivery to a customer.

The control unit 610 may use the system settings 633, the engine settings 634, and/or the media settings 635 to accurately correlate print errors with the printheads 351-390 of the print engines 127-128. The GUI 622 enables a user to input data and configure the system settings 633 (e.g., margin or trim-off widths, simplex or duplex print modes, etc.), the engine settings 634 (e.g., alignment/justification of the print engines 127-128, widths of individual printheads, etc.), and/or the media settings 635 (e.g., width of print media, N-up configuration, margins, etc.). The GUI 622 may also display the printhead error log 636 and additional information regarding statuses and metrics of print jobs processed by the print system 100.

While the specific hardware implementation of the control unit 610 is subject to design choices, one particular embodiment may include one or more processors 612 coupled with a memory 614. The processor 612 includes any electronic circuits and/or optical circuits that are able to perform functions. For example, a processor may include one or more Central Processing Units (CPU), microprocessors, Digital Signal Processors (DSPs), Application-Specific Integrated Circuits (ASICs), Programmable Logic Devices (PLD), control circuitry, etc. Some examples of processors include Intel Core processors, Advanced Reduced Instruction Set Computing (RISC) Machines (ARM) processors, etc. The memory 614 includes any hardware device that is able to store data. The memory 614 may include one or more volatile or non-volatile Dynamic Random Access Memory (DRAM) devices, FLASH devices, volatile or non-volatile Static RAM devices, hard drives, Solid State Disks (SSDs), etc. Some examples of non-volatile DRAM and SRAM include battery-backed DRAM and battery-backed SRAM. The particular arrangement, number, and configuration of components described with respect to FIGS. 1-6 are examples for purposes of discussion and are non-limiting. Illustrative details of the operation of the print verification controller 154 will be discussed with regard to FIG. 7.

Figure 7:
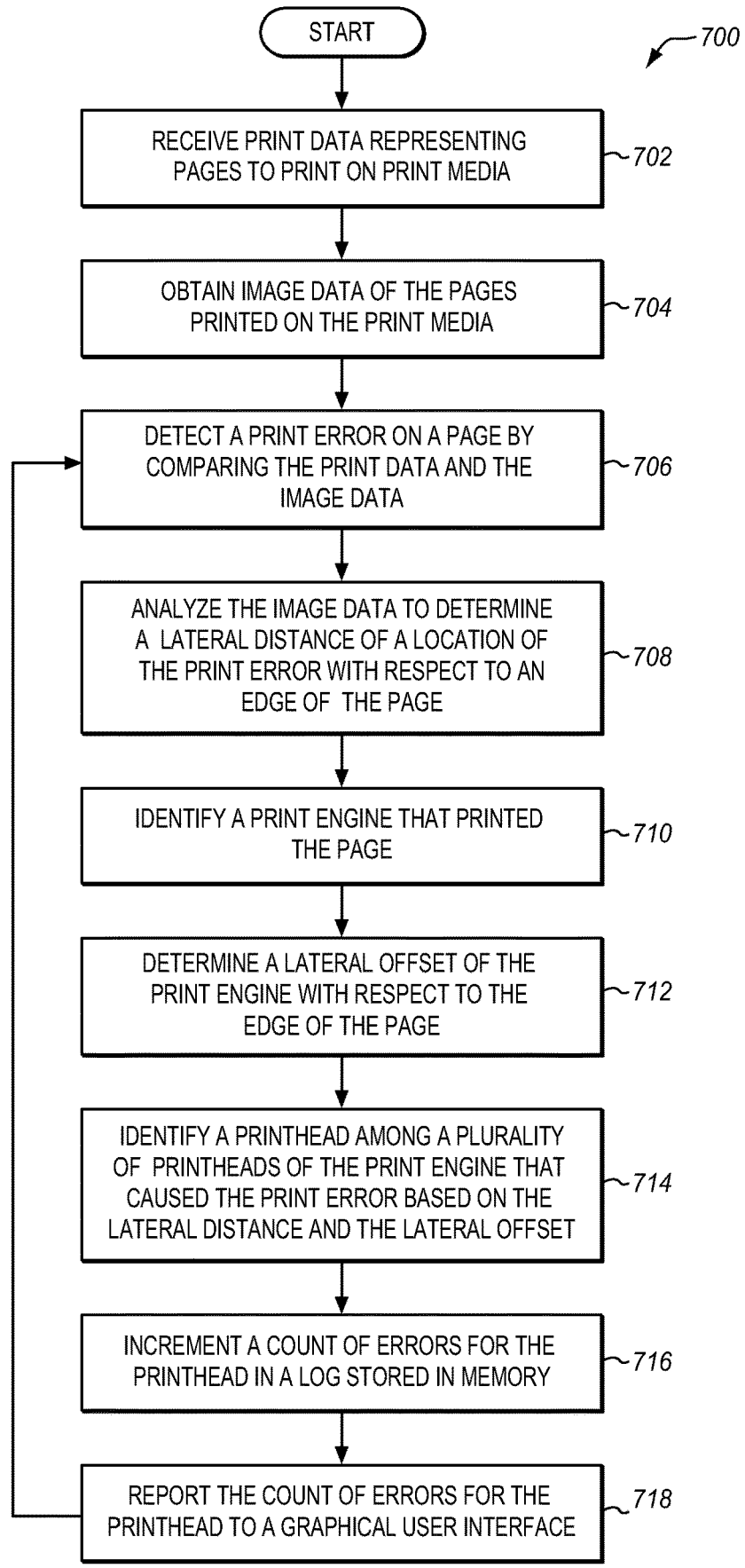
FIG. 7 is a flowchart illustrating a method for operating a print verification system an illustrative embodiment.

FIG. 7 is a flowchart illustrating a method 700 for operating the PVS 150 an illustrative embodiment. The steps of method 700 are described with reference to the print system 100, the PVS 150, and the print verification controller 154, but those skilled in the art will appreciate that method 700 may be performed in other systems. The steps of the flowcharts described herein are not all inclusive and may include other steps not shown. The steps described herein may also be performed in an alternative order.

Assume, for this embodiment, that a user has provided a print job to print server 110. Print server 110 determines, based on a job ticket for the print job, to schedule print job with the printer 120 and to verify the output of the job with the PVS 150. Therefore, the print server 110 transmits the print job to the printer 120 for printing and verification, and the printer 120 receives print data for the print job.

In step 702, the print verification controller 154 receives print data representing pages to print on print media. The print verification controller 154 may receive rasterized logical pages via the interface 152. The rasterized logical pages may represent ideal versions of incoming physical pages of print media for the print job. The print controller 126 of the printer 120 may transmit the rasterized pages of print data for the job to the PVS 150, and direct the printheads 351-390 of the print engines 127-128 print the rasterized pages onto a page of physical print media.

In step 704, the print verification controller 154 obtains image data of the pages printed on the print media. In doing so, the print verification controller 154 may operate the imaging device 156 to image pages of physical print media that have been marked by the printer 120. This may comprise photographing/scanning each page printed on the web 130 as each page travels beneath the imaging device 156.

In step 706, the print verification controller 154 detects a print error on a page by comparing the print data and the image data. In doing so, the print verification controller 154 may correlate images of the physical pages with the rasterized logical pages. For example, the print verification controller 154 may correlate physical pages with rasterized pages based on their order of receipt, based on corresponding marks included on the rasterized pages and the physical pages, etc.

In step 708, the print verification controller 154 analyzes the image data to determine a lateral distance of a location of the print error with respect to an edge of the page. As described above, a margin may exist between the edge of the page and the edge of the physical sheet of media. Moreover, for N-up configurations, the print verification controller 154 may be configured to report a lateral distance from the edge of a page that corresponds with a border of an adjacent page placed on the same side of the sheet. The origin or reference point from which the print verification controller 154 reports lateral distances of print errors may be configured in the system settings 633 of the data storage 630 and may depend on the alignment of the imaging device 156 with respect to the web 130, properties defined in the media settings 635, etc.

In step 710, the print verification controller 154 identifies a print engine that printed the page. The print verification controller 154 may correlate one of the print engines 127-128 with the page that includes the print error based on marks detected on the physical pages, which one of multiple imaging devices 156 (e.g., positioned above or below the web 130) detected the print error, and/or an analysis of print data information stored in memory that correlates a print engine with a page.

In step 712, the print verification controller 154 determines a lateral offset of the print engine with respect to the edge of the page. Thus, after identifying which of the print engines 127-128 caused the print error, the print verification controller 154 may access the engine settings 634 and/or the media settings 635 to retrieve information describing an alignment of that print engine with respect to the reported location of the print error on the page. For example, the print verification controller 154 may determine a distance value for the margins 430/530, a value of the overhang distances 436/536, a value of the widths 432/532 of the books 401/402, and/or a value of the printhead widths 434/534.

In step 714, the print verification controller 154 identifies a printhead among a plurality of printheads of the print engine that caused the print error based on the lateral distance and the lateral offset. That is, the print verification controller 154 may correlate the converted lateral distances 454/464/545/564 with an individual one of the printheads 351-390 by determining which distance values to include in its calculations. An example of this determination is described in greater detail below with respect to FIG. 8.

In step 716, the print verification controller 154 increments a count of errors for the printhead in a log stored in memory. That is, after identifying the printhead which produced the print error, the print verification controller 154 may update the printhead error log 636 to reflect the print error. Steps 706-716 may be repeated to automatically track/associate individual printheads with print error rates/types as print jobs are processed by the print system 100.

In step 718, the print verification controller 154 reports the count of errors for the printhead to the GUI 622. Alternatively or additionally, the print verification controller 154 may trigger a notification or action in response to detecting a print error or threshold of print errors for a particular printhead (e.g., direct the printer 120 or an operator of the print system 100 to halt printing). Thus, the method 700 provides a benefit over prior systems, because it is able to provide detailed reports describing error rates of specific types of errors for each of the printheads of the print system 100, thereby enabling users to easily track error trends for the printer 120 and to target individual printheads for specific repair operations to remedy print errors.

Figure 8:
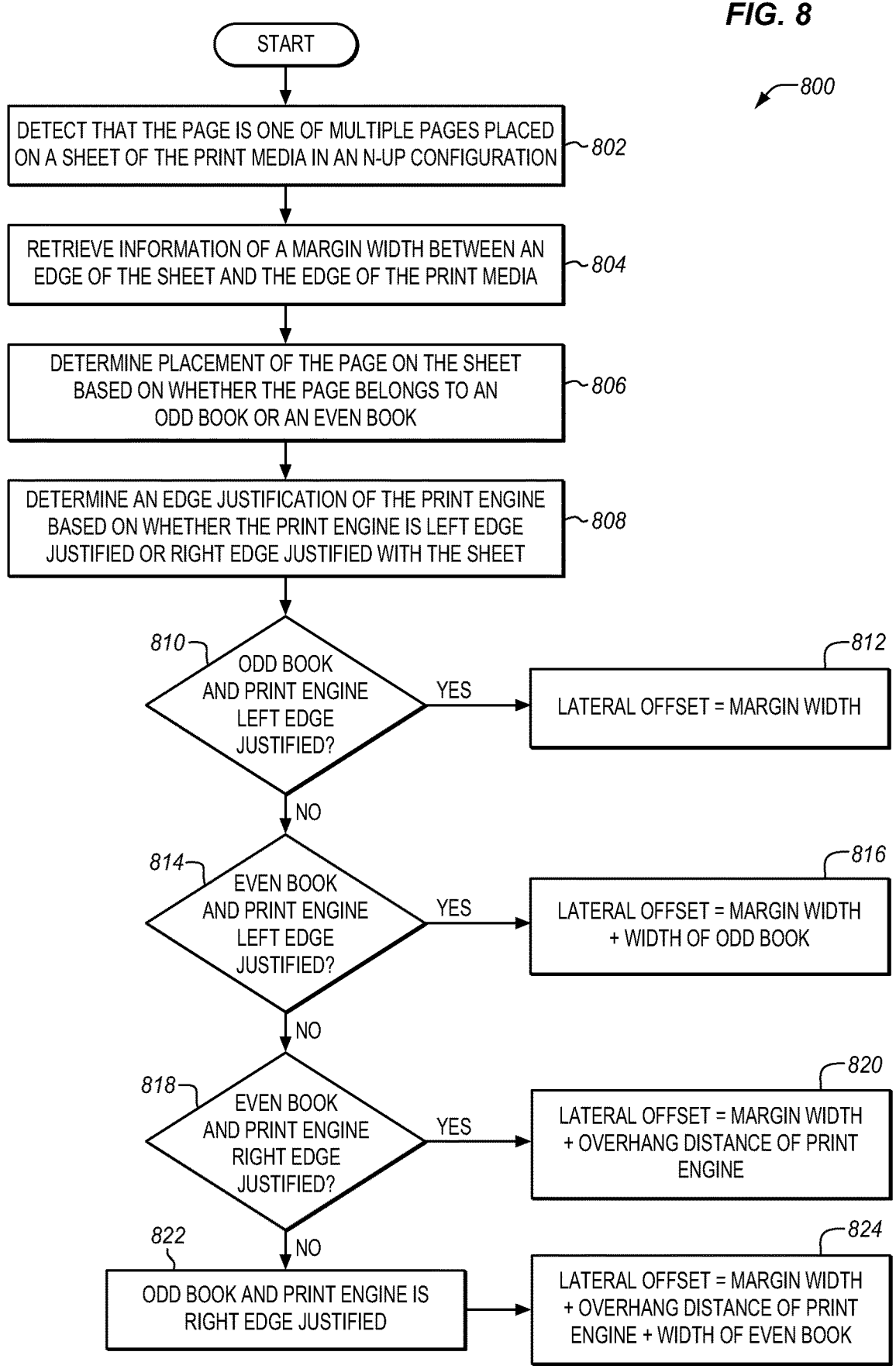
FIG. 8 is a flowchart illustrating a method for correlating a print error with an individual printhead in an illustrative embodiment.

FIG. 8 is a flowchart illustrating a method 800 for correlating a print error with an individual printhead in an illustrative embodiment. The steps of method 800 are described with reference to the print system 100, the PVS 150, and the print verification controller 154, but those skilled in the art will appreciate that method 800 may be performed in other systems. The steps of the flowcharts described herein are not all inclusive and may include other steps not shown. The steps described herein may also be performed in an alternative order.

In step 802, the print verification controller 154 detects that the page is one of multiple pages placed on a sheet of the print media in an N-up configuration. That is, in response to detecting a print error on a page, the print verification controller 154 may analyze the print data or the image data for that page to determine an N-up configuration for that page. Numerous N-up configurations and relationships of pages to sheets are possible.

In step 804, the print verification controller 154 retrieves information of a margin width between an edge of the sheet and the edge of the print media. For example, the print verification controller 154 may access the media settings 635 to determine a distance value for the margins 430/530. Alternatively, the print verification controller 154 may determine the distance value for the margins 430/530 by analyzing the image data obtained by the imaging device 156.

In step 806, the print verification controller 154 determines placement of the page on the sheet based on whether the page belongs to an odd book or an even book. The print verification controller 154 may determine that a print error belongs to one of the odd book 401 or the even book 402 based on which side of the web 130 is under analysis, a region of the web 130 that includes the print error (e.g., left half, right half, etc.), or other information in the print data or image data correlating the page with a region of the web 130.

In step 808, the print verification controller 154 determines an edge justification of the print engine based on whether the print engine is left edge justified or right edge justified with the sheet. That is, in response to identifying which of the print engines 127-128 caused the print error, the print verification controller 154 may access the engine settings 634 to retrieve a distance value for one of the margins 430/530 corresponding with the appropriate print engine.

In step 810, the print verification controller 154 determines whether the page belongs to an odd book and the print engine is the first print engine. If so, the method 800 proceeds to step 812 and the print verification controller 154 determines that the lateral offset of the print engine with respect to the edge of the page is the margin width. For example, for the print error 450 caused by the print engine 127 (see e.g., FIG. 4), the print verification controller 154 may determine the converted lateral distance 454 by calculating a sum of the first lateral distance 452 and the margin 430. Otherwise, if the page does not belong to the odd book or the print engine is not the first print engine, the method 800 may proceed to step 814.

In step 814, the print verification controller 154 determines whether the page belongs to an even book and the print engine is the first print engine. If so, the method 800 proceeds to step 816 and the print verification controller 154 determines that the lateral offset of the print engine with respect to the edge of the page is a sum of the margin width and a width of the odd book. For example, for the print error 460 caused by the print engine 127 (see e.g., FIG. 4), the print verification controller 154 may determine the converted lateral distance 464 by calculating a sum of the second lateral distance 462, the margin 430, and the width 432 of the odd book 401. Otherwise, if the page does not belong to the even book or the print engine is not the first print engine, the method 800 may proceed to step 818.

In step 818, the print verification controller 154 determines whether the page belongs to an even book and the print engine is the second print engine. If so, the method 800 proceeds to step 820 and the print verification controller 154 determines that the lateral offset of the print engine with respect to the edge of the page is a sum of an overhang distance of the second print engine with respect to the edge of the sheet and the margin width. For example, for the print error 450 caused by the print engine 128 (see e.g., FIG. 5), the print verification controller 154 may determine the converted lateral distance 554 by calculating a sum of the first lateral distance 452, the margin 530, and the overhang distance 536. Otherwise, if the page does not belong to the odd book or the print engine is not the second print engine, the method 800 may proceed to step 822.

In step 822, the print verification controller 154 determines whether the page belongs to an odd book and the print engine is the second print engine. If so, the method 800 proceeds to step 824 and the print verification controller 154 determines that the lateral offset of the print engine with respect to the edge of the page is a sum of the overhang distance of the second print engine with respect to the edge of the sheet, the margin width, and a width of the even book. For example, for the print error 460 caused by the print engine 128 (see e.g., FIG. 5), the print verification controller 154 may determine the converted lateral distance 564 by calculating a sum of the second lateral distance 462, the margin 530, the overhang distance 536, and the width 532 of the even book 402. Steps 802-824 of the method 800 may repeat as the print verification controller 154 detects print errors in printed pages.

Figure 9:
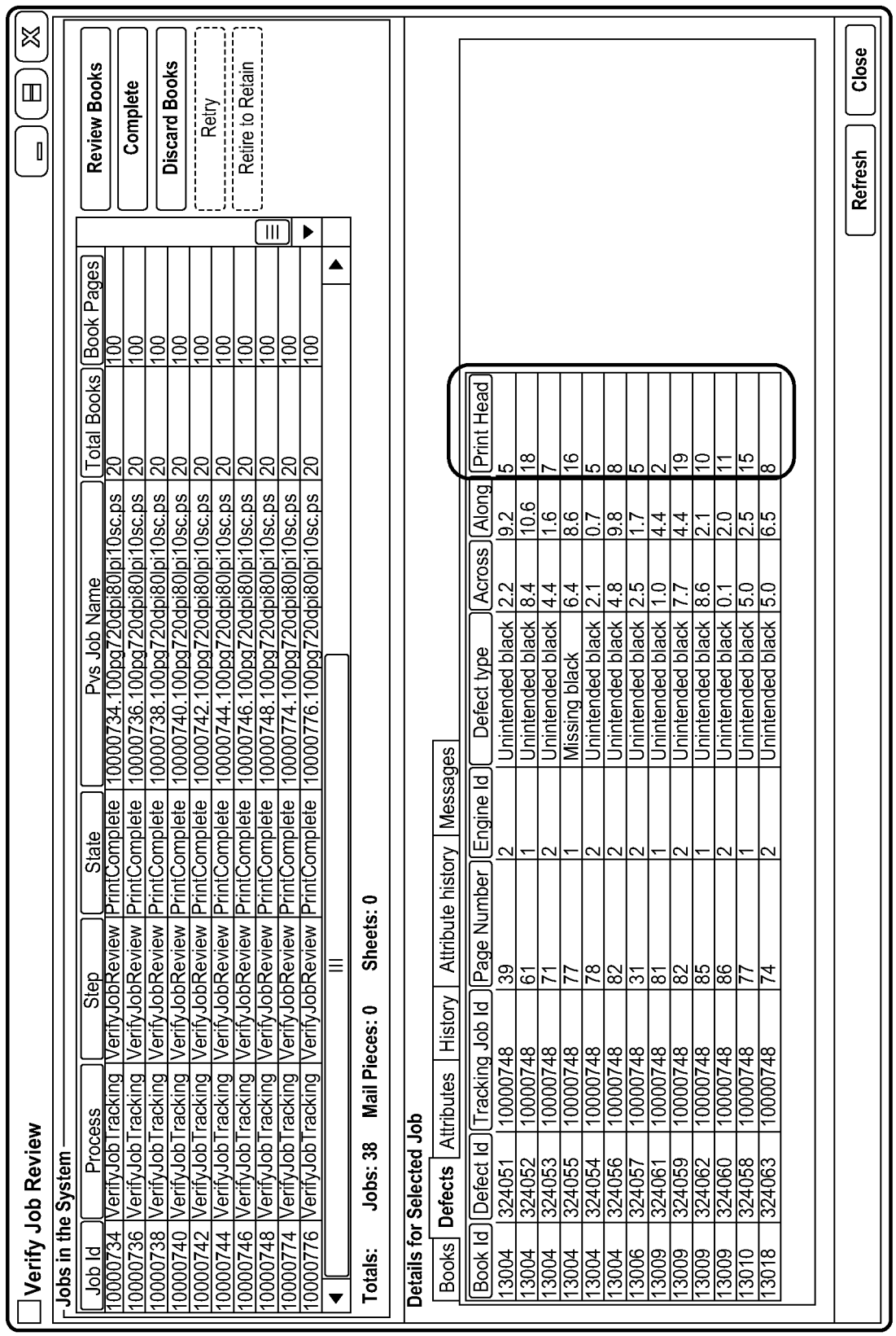
FIG. 9 illustrates a graphical user interface in an illustrative embodiment.

FIG. 9 illustrates a view 900 of the GUI 622 in an illustrative embodiment. As illustrated in this example, the GUI 622 may display a running count of errors for each individual printhead in the print system 100. Displayed information may be viewed/sorted according to jobs, book, defect types, printhead defect rates, etc. A user may therefore easily identify problematic trends in the print system 100 and order targeted fixes to individual printheads according to the detailed error information.

FIG. 10 illustrates a printhead error log 1000 in an illustrative embodiment. As illustrated in this example, the printhead error log 1000 (e.g., stored in data storage 630 of the print verification controller 154) may associate each individual printhead of a print engine with a rate of print defects caused by that printhead. The detected amount of defects may be used by the print verification controller 154 to display a message that includes a recommendation (e.g., halt printing, do not halt printing, etc.), and/or to send a report of this information for storage at the printer 120 or to another suitable network-accessible location (e.g. via e-mail) for review by a user or network device.

Figure 11:
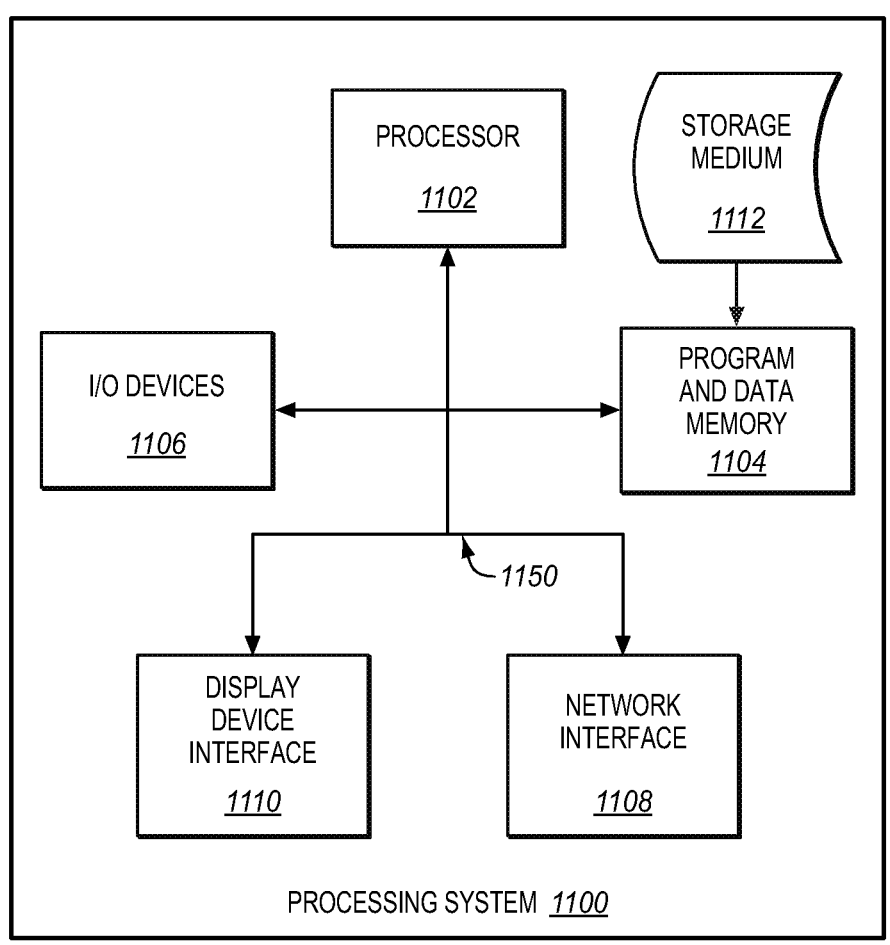
FIG. 11 illustrates a processing system operable to execute a computer readable medium embodying programmed instructions to perform desired functions in an illustrative embodiment.

Embodiments disclosed herein can take the form of software, hardware, firmware, or various combinations thereof. In one particular embodiment, software is used to direct a processing system of the print verification system 150 to perform the various operations disclosed herein. FIG. 11 illustrates a processing system 1100 operable to execute a computer readable medium embodying programmed instructions to perform desired functions in an illustrative embodiment. Processing system 1100 is operable to perform the above operations by executing programmed instructions tangibly embodied on computer readable storage medium 1112. In this regard, embodiments of the invention can take the form of a computer program accessible via computer-readable medium 1112 providing program code for use by a computer or any other instruction execution system. For the purposes of this description, computer readable storage medium 1112 can be anything that can contain or store the program for use by the computer.

Computer readable storage medium 1112 can be an electronic, magnetic, optical, electromagnetic, infrared, or semiconductor device. Examples of computer readable storage medium 1112 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Processing system 1100, being suitable for storing and/or executing the program code, includes at least one processor 1102 coupled to program and data memory 1104 through a system bus 1150. Program and data memory 1104 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 1106 (including but not limited to keyboards, displays, pointing devices, etc.) can be coupled either directly or through intervening I/O controllers. Network adapter interfaces 1108 may also be integrated with the system to enable processing system 1100 to become coupled to other data processing systems or storage devices through intervening private or public networks. Modems, cable modems, IBM Channel attachments, SCSI, Fibre Channel, and Ethernet cards are just a few of the currently available types of network or host interface adapters. Display device interface 1110 may be integrated with the system to interface to one or more display devices, such as printing systems and screens for presentation of data generated by processor 1102.

Although specific embodiments were described herein, the scope of the invention is not limited to those specific embodiments. The scope of the invention is defined by the following claims and any equivalents thereof.

What is claimed is:

1. A system comprising:
a print verification system comprising:
an interface configured to receive print data representing pages to print on print media;
an imaging device configured to obtain image data of the pages printed on the print media; and
a processor configured to detect a print error on a page by comparing the print data and the image data, to analyze the image data to determine a lateral distance of a location of the print error with respect to an edge of the page, to identify a print engine that printed the page, to determine a lateral offset of the print engine with respect to the edge of the page, to identify a printhead among a plurality of printheads of the print engine that caused the print error based on the lateral distance of the print error and the lateral offset of the print engine, to increment a count of errors for the printhead in a log stored in memory, and to report the count of errors for the printhead to a graphical user interface.

2. The system of claim 1 wherein:
the processor is configured to determine the lateral offset of the print engine with respect to the edge of the page by:
detecting that the page is one of multiple pages placed on a sheet of the print media in an N-up configuration, wherein N is an integer greater than one;
retrieving information of a margin width between an edge of the sheet and an edge of the print media;
determining a placement of the page on the sheet based on whether the page belongs to an odd book or an even book;
determining an edge justification of the print engine based on whether the print engine that printed the page is one of a first print engine that is left edge justified with the sheet for printing on a front side of the sheet or one of a second print engine that is right edge justified with the sheet for printing on a back side of the sheet; and
determining the lateral offset based on the margin width, the placement, and the edge justification.

3. The system of claim 2 wherein:
responsive to determining that the page belongs to an odd book and that the print engine is the first print engine, the processor is configured to determine that the lateral offset of the print engine with respect to the edge of the page is the margin width;
responsive to determining that the page belongs to an even book and that the print engine is the first print engine, the processor is configured to determine that the lateral offset of the print engine with respect to the edge of the page is a sum of the margin width and a width of an odd book in the N-up configuration;
responsive to determining that the page belongs to an even book and that the print engine is the second print engine, the processor is configured to determine that the lateral offset of the print engine with respect to the edge of the page is a sum of an overhang distance of the second print engine with respect to the edge of the sheet and the margin width; and
responsive to determining that the page belongs to an odd book and that the print engine is the second print engine, the processor is configured to determine that the lateral offset of the print engine with respect to the edge of the page is a sum of the overhang distance of the second print engine with respect to the edge of the sheet, the margin width, and a width of an even book in the N-up configuration.

4. The system of claim 1 wherein:
the processor is configured to retrieve information of printhead widths of the print engine, and to correlate the lateral distance of the print error and the lateral offset of the print engine with the printhead widths to identify the printhead among the plurality of printheads of the print engine that caused the print error.

5. The system of claim 1 wherein:
the processor is configured to identify the print engine among a plurality of print engines based on an engine identifier marked in a margin of the page.

6. The system of claim 1 wherein:
the processor is configured to track an error rate for each of the plurality of printheads of the print engine, to receive a request to display error information for the print engine, and to direct the graphical user interface to display a report that includes a total number of defects for each of the printheads.

7. The system of claim 1 further comprising:
a print system comprising:
a first print engine having multiple printheads arranged in a lateral direction, wherein the first print engine is left edge justified and configured to print on a front side of a sheet; and
a second print engine having multiple printheads arranged in the lateral direction, wherein the second print engine is right edge justified and configured to print on a back side of the sheet;
a Raster Image Processor (RIP) configured to rasterize the print data; and
a print controller configured to transmit the print data to the print verification system, and to direct the printheads of the first print engine and the second print engine to mark the print media based on the print data.

8. A method comprising:
receiving print data representing pages to print on print media;
obtaining image data of the pages printed on the print media;
detecting a print error on a page by comparing the print data and the image data;
analyzing the image data to determine a lateral distance of a location of the print error with respect to an edge of the page;
identifying a print engine that printed the page;
determining a lateral offset of the print engine with respect to the edge of the page;
identifying a printhead among a plurality of printheads of the print engine that caused the print error based on the lateral distance of the print error and the lateral offset of the print engine;
incrementing a count of errors for the printhead in a log stored in memory; and
reporting the count of errors for the printhead to a graphical user interface.

9. The method of claim 8 further comprising:
determining the lateral offset of the print engine with respect to the edge of the page by:
detecting that the page is one of multiple pages placed on a sheet of the print media in an N-up configuration, wherein N is an integer greater than one;
retrieving information of a margin width between an edge of the sheet and the edge of the print media;

determining a placement of the page on the sheet based on whether the page belongs to an odd book or an even book;

determining an edge justification of the print engine based on whether the print engine that printed the page is one of a first print engine that is left edge justified with the sheet for printing on a front side of the sheet or one of a second print engine that is right edge justified with the sheet for printing on a back side of the sheet; and determining the lateral offset based on the margin width, the placement, and the edge justification.

10. The method of claim 9 further comprising:

in response to determining that the page belongs to an odd book and that the print engine is the first print engine, determining that the lateral offset of the print engine with respect to the edge of the page is the margin width;

in response to determining that the page belongs to an even book and that the print engine is the first print engine, determining that the lateral offset of the print engine with respect to the edge of the page is a sum of the margin width and a width of an odd book in the N-up configuration;

in response to determining that the page belongs to an even book and that the print engine is the second print engine, determining that the lateral offset of the print engine with respect to the edge of the page is a sum of an overhang distance of the second print engine with respect to the edge of the sheet and the margin width; and in response to determining that the page belongs to an odd book and that the print engine is the second print engine, determining that the lateral offset of the print engine with respect to the edge of the page is a sum of the overhang distance of the second print engine with respect to the edge of the sheet, the margin width, and a width of an even book in the N-up configuration.

11. The method of claim 8 further comprising:

retrieving information of printhead widths of the print engine; and correlating the lateral distance of the print error and the lateral offset of the print engine with the printhead widths to identify the printhead among the plurality of printheads of the print engine that caused the print error.

12. The method of claim 8 further comprising:

identifying the print engine among a plurality of print engines based on an engine identifier marked in a margin of the page.

13. The method of claim 8 further comprising:

tracking an error rate for each of the plurality of printheads of the print engine;

receiving a request to display error information for the print engine; and directing the graphical user interface to display a report that includes a total number of defects for each of the printheads.

14. A non-transitory computer-readable storage medium including programmed instructions which, when executed by a processor, are operable for performing a method, the method comprising:

receiving print data representing pages to print on print media;

obtaining image data of the pages printed on the print media;

detecting a print error on a page by comparing the print data and the image data;

analyzing the image data to determine a lateral distance of a location of the print error with respect to an edge of the page;

identifying a print engine that printed the page;

determining a lateral offset of the print engine with respect to the edge of the page;

identifying a printhead among a plurality of printheads of the print engine that caused the print error based on the lateral distance of the print error and the lateral offset of the print engine;

incrementing a count of errors for the printhead in a log stored in memory; and reporting the count of errors for the printhead to a graphical user interface.

15. The medium of claim 14 wherein the method further comprises:

determining the lateral offset of the print engine with respect to the edge of the page by:

detecting that the page is one of multiple pages placed on a sheet of the print media in an N-up configuration, wherein N is an integer greater than one;

retrieving information of a margin width between an edge of the sheet and the edge of the print media;

determining a placement of the page on the sheet based on whether the page belongs to an odd book or an even book;

determining an edge justification of the print engine based on whether the print engine that printed the page is one of a first print engine that is left edge justified with the sheet for printing on a front side of the sheet or one of a second print engine that is right edge justified with the sheet for printing on a back side of the sheet; and determining the lateral offset based on the margin width, the placement, and the edge justification.

16. The medium of claim 15 wherein the method further comprises:

in response to determining that the page belongs to an odd book and that the print engine is the first print engine, determining that the lateral offset of the print engine with respect to the edge of the page is the margin width;

in response to determining that the page belongs to an even book and that the print engine is the first print engine, determining that the lateral offset of the print engine with respect to the edge of the page is a sum of the margin width and a width of an odd book in the N-up configuration;

in response to determining that the page belongs to an even book and that the print engine is the second print engine, determining that the lateral offset of the print engine with respect to the edge of the page is a sum of an overhang distance of the second print engine with respect to the edge of the sheet and the margin width; and in response to determining that the page belongs to an odd book and that the print engine is the second print engine, determining that the lateral offset of the print engine with respect to the edge of the page is a sum of the overhang distance of the second print engine with respect to the edge of the sheet, the margin width, and a width of an even book in the N-up configuration.

17. The medium of claim 14 wherein the method further comprises:

retrieving information of printhead widths of the print engine; and correlating the lateral distance of the print error and the lateral offset of the print engine with the printhead widths to identify the printhead among the plurality of printheads of the print engine that caused the print error.

18. The medium of claim 14 wherein the method further comprises:
identifying the print engine among a plurality of print engines based on an engine identifier marked in a margin of the page.

19. The medium of claim 14 wherein the method further comprises:
tracking an error rate for each of the plurality of printheads of the print engine;
receiving a request to display error information for the print engine; and
directing the graphical user interface to display a report that includes a total number of defects for each of the printheads.

20. The medium of claim 14 wherein the method further comprises:
rasterizing the print data;
printing on a front side of a sheet with a first print engine having multiple printheads arranged in a lateral direction, wherein the first print engine is left edge justified;
printing on a back side of the sheet with a second print engine having multiple printheads arranged in the lateral direction, wherein the second print engine is right edge justified; and transmitting the print data to a print verification system.

* * * * *